(12) United States Patent
Kueckendahl et al.

(10) Patent No.: US 8,982,335 B2
(45) Date of Patent: Mar. 17, 2015

(54) MARKING OR SCANNING APPARATUS WITH A MEASURING DEVICE FOR MEASURING THE SPEED OF AN OBJECT AND A METHOD OF MEASURING THE SPEED OF AN OBJECT WITH SUCH A MARKING OR SCANNING APPARATUS

(75) Inventors: Peter Joerg Kueckendahl, Bad Oldesloe (DE); Daniel Joseph Ryan, Sycamore, IL (US)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 50 days.

(21) Appl. No.: 13/976,814

(22) PCT Filed: Dec. 22, 2011

(86) PCT No.: PCT/EP2011/006518
§ 371 (c)(1),
(2), (4) Date: Aug. 28, 2013

(87) PCT Pub. No.: WO2012/089323
PCT Pub. Date: Jul. 5, 2012

(65) Prior Publication Data
US 2013/0342823 A1 Dec. 26, 2013

(30) Foreign Application Priority Data
Dec. 30, 2010 (EP) .................................... 10016201

(51) Int. Cl.
*G01P 3/36* (2006.01)
*B41J 2/46* (2006.01)
(Continued)

(52) U.S. Cl.
CPC ... *G01P 3/36* (2013.01); *B41J 2/46* (2013.01); *G01P 1/026* (2013.01); *G01P 3/68* (2013.01); *G01S 7/4818* (2013.01); *G01S 17/58* (2013.01)
USPC ............................................ 356/28; 356/28.5

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,707,063 A | 11/1987 | Plummer |
| 5,399,032 A | 3/1995 | Itoh et al. |

(Continued)

FOREIGN PATENT DOCUMENTS

| DE | 2401322 | 1/1974 |
| DE | 3826113 A1 | 2/1989 |

(Continued)

OTHER PUBLICATIONS

U.S. Appl. No. 13/976,779, Office Action dated Jun. 16, 2014.
(Continued)

*Primary Examiner* — Luke Ratcliffe
(74) *Attorney, Agent, or Firm* — Hoffman Warnick LLC

(57) ABSTRACT

Apparatus for marking and/or scanning (m/s) an object comprising a m/s head (20) having a plurality of receiving spaces (24) for m/s devices (40), a driving mechanism for moving the object, a measuring device (50) for measuring the object speed comprising a transmitter having a transmitting fibre (56) for transmitting light to the object, a receiver having first and second light receiving fibres (57, 58) for receiving light reflected from the object forming light signals, and processor means (70) for determining a time shift between the light signals to provide a speed value of the object, all the fibres are arranged in a common first ferrule (52), the m/s devices include second ferrules, the first and second ferrules have corresponding connector sections and are variably connected to the receiving spaces of the scanning head, and the speed measuring device is arranged in one of the receiving spaces. The invention further relates to a method for measuring the object speed with the m/s apparatus.

14 Claims, 6 Drawing Sheets

(51) Int. Cl.
  *G01P 1/02* (2006.01)
  *G01P 3/68* (2006.01)
  *G01S 7/481* (2006.01)
  *G01S 17/58* (2006.01)

(56) References Cited

U.S. PATENT DOCUMENTS

| | | |
|---|---|---|
| 5,477,259 A | 12/1995 | Iwasa |
| 5,777,634 A | 7/1998 | Okamura et al. |
| 5,784,098 A * | 7/1998 | Shoji et al. .................. 348/45 |
| 6,189,991 B1 | 2/2001 | Wen et al. |
| 6,286,927 B1 | 9/2001 | Taneya et al. |
| 6,381,377 B1 | 4/2002 | Wang |
| 6,469,729 B1 | 10/2002 | Ryan |
| 6,738,086 B2 | 5/2004 | Oka |
| 6,855,921 B1 | 2/2005 | Stopperan et al. |
| 7,354,130 B2 | 4/2008 | Arakawa |
| 7,448,719 B1 | 11/2008 | Newell |
| 7,564,020 B2 | 7/2009 | Sergyeyenko |
| 7,671,337 B1 * | 3/2010 | Tidwell .................... 250/339.11 |
| 7,908,968 B2 | 3/2011 | McCoin et al. |
| 2002/0001004 A1 | 1/2002 | Mantell et al. |
| 2002/0101469 A1 | 8/2002 | Wade et al. |
| 2002/0139273 A1 | 10/2002 | Murata et al. |
| 2002/0191069 A1 | 12/2002 | Oka |
| 2003/0016348 A1 * | 1/2003 | Sallee ........................ 356/141.1 |
| 2003/0210861 A1 | 11/2003 | Weiss et al. |
| 2003/0235373 A1 | 12/2003 | Ishii et al. |
| 2004/0160478 A1 | 8/2004 | Weijkamp et al. |
| 2005/0122548 A1 | 6/2005 | Cunnigan et al. |
| 2005/0123303 A1 | 6/2005 | Guttman et al. |
| 2005/0140770 A1 | 6/2005 | Kang et al. |
| 2005/0286093 A1 | 12/2005 | Sumi et al. |
| 2006/0066924 A1 | 3/2006 | Delueg |
| 2006/0109525 A1 | 5/2006 | Evans |
| 2007/0091132 A1 | 4/2007 | Lim |
| 2007/0279713 A1 | 12/2007 | Feng et al. |
| 2008/0055352 A1 | 3/2008 | Toh et al. |
| 2008/0246962 A1 * | 10/2008 | Yang ........................... 356/326 |
| 2010/0002057 A1 | 1/2010 | Hatasa et al. |
| 2010/0214387 A1 | 8/2010 | Fox et al. |
| 2010/0231929 A1 | 9/2010 | Kakigi |
| 2013/0021398 A1 | 1/2013 | Mizes et al. |
| 2013/0286147 A1 | 10/2013 | Kueckendahl et al. |
| 2013/0286148 A1 | 10/2013 | Kueckendahl et al. |
| 2013/0286149 A1 | 10/2013 | Kueckendahl et al. |
| 2013/0293658 A1 | 11/2013 | Kueckendahl et al. |
| 2013/0328978 A1 | 12/2013 | Sekino et al. |
| 2013/0342823 A1 | 12/2013 | Kueckendahl et al. |

FOREIGN PATENT DOCUMENTS

| | | | |
|---|---|---|---|
| EP | 0121369 | A2 | 10/1984 |
| EP | 0832754 | B1 | 12/1993 |
| EP | 0832752 | A2 | 4/1998 |
| EP | 1266763 | A1 | 12/2002 |
| EP | 1640169 | A3 | 9/2005 |
| EP | 1640169 | A2 | 3/2006 |
| EP | 1640169 | A3 | 10/2007 |
| EP | 2105309 | A1 | 9/2009 |
| JP | 59136267 | | 8/1984 |
| JP | 05185686 | | 7/1993 |
| JP | 2001332806 | A | 11/2001 |
| JP | 2007090814 | A | 4/2007 |
| JP | 2008126471 | A | 6/2008 |
| JP | 2009037128 | A | 2/2009 |
| WO | 8505187 | A1 | 11/1985 |
| WO | WO85/05187 | * | 11/1985 ............... G01P 3/68 |
| WO | 2006037973 | A1 | 4/2006 |
| WO | 2007107030 | A1 | 9/2007 |
| WO | 2008104222 | A1 | 9/2008 |
| WO | 2009153795 | A1 | 12/2009 |

OTHER PUBLICATIONS

U.S. Appl. No. 13/976,804, Notice of Allowance dated Mar. 20, 2014.
U.S. Appl. No. 13/976,809, Office Action dated May 27, 2014.
U.S. Appl. No. 13/977,159, Office Action dated Jun. 20, 2014.
U.S. Appl. No. 13/976,832, Notice of Allowance and Fees Due dated Jun. 24, 2014.
U.S. Appl. No. 13/976,804, Office Action dated Jul. 8, 2014.
U.S. Appl. No. 13/976,793, Office Action dated Jul. 1, 2014.
U.S. Appl. No. 13/977,151, Notice of Allowance and Fees Due dated Aug. 4, 2014.
U.S. Appl. No. 13/977,156, Office Action dated Jul. 9, 2014.
International Application No. PCT/EP2011/006518, Written Opinion of International Search Authority.
International Application No. PCT/EP2011/006522, Written Opinion of International Search Authority.
International Application No. PCT/EP2011/006522, International Report on Patentability.
International Application No. PCT/EP2011/00652023, Written Opinion of International Search Authority.
International Application No. PCT/EP2011/006515, International Preliminary Report on Patentability, Jan. 21, 2013.
International Application No. PCT/EP2011/006515, Written Opinion on Search Report.
International Application No. PCT/EP2011/006514, Written Opinion of International Search Authority.
International Application No. PCT/EP2011/006516, International Search Report, dated Mar. 23, 2012, 3 pages.
International Application No. PCT/EP2011/006520, Written Opinion of International Search Authority.
International Application No. PCT/EP2011/006521, Written Opinion of International Search Authority.
International Application No. PCT/EP2011/006521, Written Opinion of International Examining Authority.
International Application No. PCT/EP2011/006516, Written Opinion of International Search Authority.
International Application No. PCT/EP2011/006517, Written Opinion of International Search Authority.
International Application No. PCT/EP2011/006519, Written Opinion of International Search Authority.
International Application No. PCT/EP2011/006519, Preliminary Report on Patentability.
U.S. Appl. No. 13/976,832, Notice of Allowance dated Oct. 8, 2014, A593, 61 pages.
U.S. Appl. No. 13/976,804, Final Office Action dated Oct. 24, 2014, A585, pp. 18.
U.S. Appl. No. 13/977,159, Final Office Action dated Oct. 10, 2014, A605, 53 pages.
U.S. Appl. No. 13/977,156, Final Office Action dated Dec. 5, 2014, A617, 13 pages.
U.S. Appl. No. 13/976,793, Notice of Allowance dated Dec. 9, 2014, A609, 66 pages.
U.S. Appl. No. 13/976,779, Notice of Allowance dated Oct. 21, 2014, A601, 34 pages.

* cited by examiner

MARKING OR SCANNING APPARATUS WITH A MEASURING DEVICE FOR MEASURING THE SPEED OF AN OBJECT AND A METHOD OF MEASURING THE SPEED OF AN OBJECT WITH SUCH A MARKING OR SCANNING APPARATUS

FIELD OF THE INVENTION

The present invention relates to a measuring device for measuring the speed of an object. The invention further relates to a method for measuring the speed of an object.

RELATED ART

Measuring devices for measuring the speed of an object are well known in the art. In many applications, the rotating speed of a driveshaft, which drives the object, is measured and the determined value is converted to the speed of the object. A drawback of this principle of measurement is a limited accuracy, if for example the object is placed on a conveyor belt and there is a slip between the conveyor belt and the driveshaft or between the object and the conveyor belt.

A known marking and/or scanning apparatus for marking and/or scanning an object comprises a marking and/or scanning head having a plurality of receiving spaces for individual marking and/or scanning devices and a driving mechanism for providing a relative movement of the object relative to the marking and/or scanning head in an advance direction during a marking and/or scanning operation.

In marking and/or scanning apparatuses of this type, the object is usually placed on a conveyor belt, which is driven by a driveshaft. In the prior art the speed of the object is measured based on the rotating speed of the driveshaft. As explained above, a drawback of this measuring principle is that a slip between the driveshaft and the conveyor belt adversely affects the preciseness of the measuring result.

Another example of a measuring principle is the use of photodetectors or photosensors to determine the speed of an object based on the time the object needs to cover a certain distance.

SUMMARY OF THE INVENTION

It is an object of the invention to provide a measuring device for measuring the speed of an object, wherein the measuring device has a high measuring accuracy and is in particular suitable for accurately measuring the speed of an object to be marked or scanned in a marking and/or scanning apparatus. It is a further object of the invention to provide a method for measuring the speed of an object with a high measuring accuracy and in particular for accurately measuring the speed of an object to be marked or scanned in a marking and/or scanning apparatus.

The object is solved according to the invention with a measuring device for measuring the speed of an object and a method for measuring the speed of an object.

An inventive measuring device comprises a transmitter having a transmitting fibre for transmitting a light to the object, a receiver having a first receiving fibre and a second receiving fibre for receiving light reflected from the object, wherein the reflected light received by the first receiving fibre forms a first light signal and a reflected light received by the second receiving fibre forms a second light signal, and a sensor and signal processor means for detecting the first and second light signals, for determining a time shift between the first light signal and the second light signal and for converting the determined time shift to a speed value of the object. The transmitting fibre, the first receiving fibre and the second receiving fibre are arranged in a common ferrule.

In an inventive method light is transmitted to the object through a transmitting fibre, the light is at least partly reflected or scattered by the object and received by a first receiving fibre and a second receiving fibre, wherein the reflected light received the first receiving fibre forms a first light signal and the reflected light received by the second receiving fibre forms a second light signal and wherein the transmitting fibre, the first receiving fibre and the second receiving fibre are arranged in a common ferrule, the first and second light signals are detected and a time shift between the first light signal and the second light signal is determined and converted to a speed value of the object.

One idea of the invention is to provide a speed measuring device having a plurality of optical fibres arranged in a common housing called a ferrule. In particular, the ends of the fibres are arranged in the ferrule. The ferrule is adapted to tightly hold the fibre ends arranged therein, that is, to tightly hold the ends of at least one transmitting fibre and at least two receiving fibres.

The measuring device is based on the principle of determining the speed of the object with an optical sensor element such as a photosensor or photodetector arranged in the sensor and signal processor means. The photosensor or photodetector may be a photodiode, a phototransistor, or a photoresistor.

Light is transmitted onto a surface of the object through a transmitting fibre, reflected or scattered by the surface of the object and received by two receiving fibres. At an end of the transmitting fibre opposed to the surface of the object, a lighting element such as a light emitting diode (LED) is arranged to emit a light signal. The light emitted by the lighting element and transmitted through the transmitting fibre may be visible light, infrared light or any other type of electromagnetic radiation. The light is detected by one or more sensor elements such as photodiodes arranged at an end of the receiving fibres opposed to the surface of the object.

Due to the movement of the object, there is a time shift between the light received by the first receiving fibre and the light received by the second receiving fibre.

In a preferred embodiment of the invention the sensor and signal processor means comprises at least one sensor element connected to the first receiving fibre and the second receiving fibre, the sensor element being configured to detect varying light power levels due to a roughness and/or structure of a surface of the object and the sensor and signal processor means is configured to convert a phase shift of the varying light power levels to the speed value of the object.

According to this embodiment of the invention an inherent roughness and/or structure in the surface of the object leads to varying light power levels, which are detectable by a sensor element. The varying light power levels are in particular detectable at the ends of both the first and second receiving fibres. If the object is moved along an advance direction, which may also be called a product movement direction, there will be a time or phase shift between the varying light power levels received by the first receiving fibre and the second receiving fibre. This time or phase shift is converted to the speed value of the object.

As the inherent roughness and/or structure of the object is used for determining a time shift between the light signals, the object may be a one-colored object, for example a piece of paper or an object made of plastic such as a cap of a bottle. The object can have a planar surface with a micro-structure of roughness or have a structured surface such as a profiling, as for example the profiled surface of a plastic cap of a bottle.

With the sensor element being adapted and configured to detect rather small differences in the light power or light intensity, it is not necessary to provide a special speed measuring marking on the object. The presence of a roughness and/or structure on the object may be sufficient for determining the speed of the object based on the detected phase or time shift of the light power levels.

For measuring it is preferred, that an optical element, in particular at least one optical lens, may be provided in front of the fibre ends, in particular between the fibres ends and the object. The optical element may in particular be configured to focus the light emitted by the transmitting fibre and reflected from the object.

In a preferred embodiment the ferrule has a body having a substantially cylindrical outer shape with a profiling for being inserted into a receiving hole of a marking and/or scanning apparatus in a defined angular position.

For establishing the defined angular position the ferrule may in particular be keyed, so that it may be placed in a receiving hole having a corresponding keying in a defined position. It may therefore be preferred that the ferrule has a keyed body for being inserted into a receiving hole of a marking and/or scanning apparatus in a defined angular position. It may be preferred that the ferrule has a keying such as a groove or tongue extending along a longitudinal axis of the ferrule.

In another preferred embodiment the ferrule has a body with a polygonal cross-section for being inserted into a receiving hole of a marking and/or scanning apparatus in a defined angular position. The polygonal cross-section may in particular be a triangle or a rectangle. The receiving hole may have a corresponding cross-section according to the cross-section of the ferrule.

Furthermore, it may be preferred that the ferrule has a molded body. The technology of molding is an advantageous manufacturing technology in order to provide a robust body with precise predetermined dimensions.

In a further preferred embodiment the invention relates to a marking and/or scanning apparatus for marking and/or scanning an object.

The marking and/or scanning apparatus according to the invention is characterized in that a measuring device as defined in this document is arranged in at least one of the receiving spaces of the marking and/or scanning head for measuring the speed of the object in the advance direction.

An idea of this embodiment is to provide an integrated marking and/or scanning apparatus with a measuring device.

As the measuring device is integrated into the marking and/or scanning head, a high accuracy of the speed measuring result can be achieved. In particular, the inventive marking and/or scanning apparatus allows for a precise determination of the speed of the object to be marked or scanned relative to the marking and/or scanning devices arranged in the marking and/or scanning head.

The marking and/or scanning apparatus may preferably comprise a plurality of marking and/or scanning devices in a ferrule shape. The combination of marking and/or scanning devices including ferrules and a measuring device also having a ferrule provides a very flexible marking and/or scanning apparatus.

A marking and/or scanning devices can in particular include a ferrule and one or more fibre ends coupled to the ferrule. In case of a marking device, the fibres may be coupled to a lighting element, for example a laser for marking and/or engraving the object by means of a laser beam. In case of a scanning device, the fibres may be coupled to a sensor element for detecting light received through the fibre.

The shape of the ferrule of the measuring device preferably corresponds to the shape of the ferrule of at least one marking and/or scanning device, so that the measuring device and the marking and/or scanning device may be exchanged.

In a preferred embodiment the ferrules of the marking and/or scanning devices and the ferrule of the measuring device have corresponding connector sections for being variably connected to or engaged with the receiving spaces of the marking and/or scanning head. That is, the ferrules of the marking and/or scanning devices and the ferrule of the measuring device have equal or corresponding connector sections, so that a receiving space of the marking and/or scanning head may be selectively equipped with a marking and/or scanning device or the measuring device according to the invention.

In a preferred embodiment the receiving spaces of the marking and/or scanning head are receiving holes formed in a receiving plate. The receiving holes may in particular be through-holes. The ferrules of the marking and/or scanning devices and the ferrule of the measuring device may be inserted into the receiving holes and thereby coupled to the receiving plate.

In a preferred embodiment the receiving spaces are arranged in a two-dimensional array having a plurality of rows extending transversely to the advance direction, wherein the marking and/or scanning devices are arranged in at least one first row and the measuring device is arranged in a second row. The plurality of rows allows at least one row to be exclusively used for the marking and/or scanning devices, so that the complete width of the marking and/or scanning head in the transverse direction may be used for marking and/or scanning the object. In addition to such a marking and/or scanning device row, the marking and/or scanning head provides at least one additional row for arranging the measuring device.

In another preferred embodiment of the marking and/or scanning apparatus the array of receiving spaces is tilted with regard to the advance direction, wherein the receiving spaces of a successive row are offset with regard to the receiving spaces of preceding row in a direction perpendicular to the advance direction. With such a tilted or inclined position of the array the resolution of the marking and/or scanning apparatus may be enhanced.

It may be preferred that the array of receiving spaces comprises a plurality of rows and a plurality of columns, in which the receiving spaces are arranged, wherein the rows and the columns extend perpendicularly to each other. Such an array may also be called a rectangular pattern of the receiving spaces. In a preferred embodiment, the array is slightly inclined so that the receiving spaces of a successive row are offset with regard to the receiving spaces of a preceding row. The amount of off-set may be preferably smaller than a pitch between the receiving spaces of one row, wherein the pitch is defined as the distance between two adjacent or adjoining receiving spaces of one row.

In a preferred embodiment of the marking and/or scanning apparatus the marking and/or scanning head is rotatable about an axis perpendicular to the advance direction, in particular perpendicular to a surface of the object to be marked and/or scanned. In this case, it may be preferable that a measuring means is provided for determining a tilting angle of the marking and/or scanning head and that an output value of the measuring means is provided at the sensor and signal processor means. The sensor and signal processor means may then determine the speed of the object relative to the tilted marking and/or scanning head based on the time shift between the light signals and the tilting angle of the head.

In order to provide a time shift between the first light signal and the second light signal, it may be preferable that the first receiving fibre and the second receiving fibre are arranged along the advance direction. In other words, the first receiving fibre and the second receiving fibre may be arranged relative to the advance direction such that there is a predetermined distance between the central points of the first and second receiving fibres in the advance direction.

Generally, it is possible that the first receiving fibre and the second receiving fibre are offset with regard to the advance direction. However, it may be preferred, that the first receiving fibre and the second receiving fibre are aligned in the advance direction.

The transmitting fibre may be preferably arranged between the first receiving fibre and the second receiving fibre. The transmitting fibre may be aligned with at least one of the receiving fibres in the advance direction. Alternatively the transmitting fibre can be offset with regard to the first receiving fibre and/or the second receiving fibre in a direction perpendicular to the advance direction. It may be preferred that the transmitting fibre is centrally arranged between the first and second receiving fibres, that is, a distance between the first receiving fibre and the transmitting fibre is equal to a distance between the second receiving fibre and the transmitting fibre. In a preferred embodiment the transmitting fibre and the first and second receiving fibres are arranged in the corners of a triangle.

Another preferred embodiment of the invention is given by a method for marking and/or scanning an object, in particular with a marking and/or scanning apparatus as described in this document, wherein the object is marked and/or scanned by a plurality of individual marking and/or scanning devices arranged in a common marking and/or scanning head and the object is moved relative to the marking and/or scanning head in an advance direction during a marking and/or scanning operation, wherein a speed of the object in the advance direction is measured with the method as described in this document.

According to this embodiment of the invention the object may be marked and/or scanned by a plurality of marking and/or scanning devices arranged in a marking and/or scanning head, wherein the speed of the object is determined by a measuring device arranged in the same head. As the marking and/or scanning devices and the measuring device are arranged in the same head, no relative movement between these components is possible. The method therefore provides an exact determination of the speed of the object to be marked or scanned.

BRIEF DESCRIPTION OF THE DRAWINGS

The invention will be further described with reference to the attached figures, wherein.

In all figures, identical components are identified by identical reference signs.

DETAILED DESCRIPTION OF THE INVENTION

Figure 4:
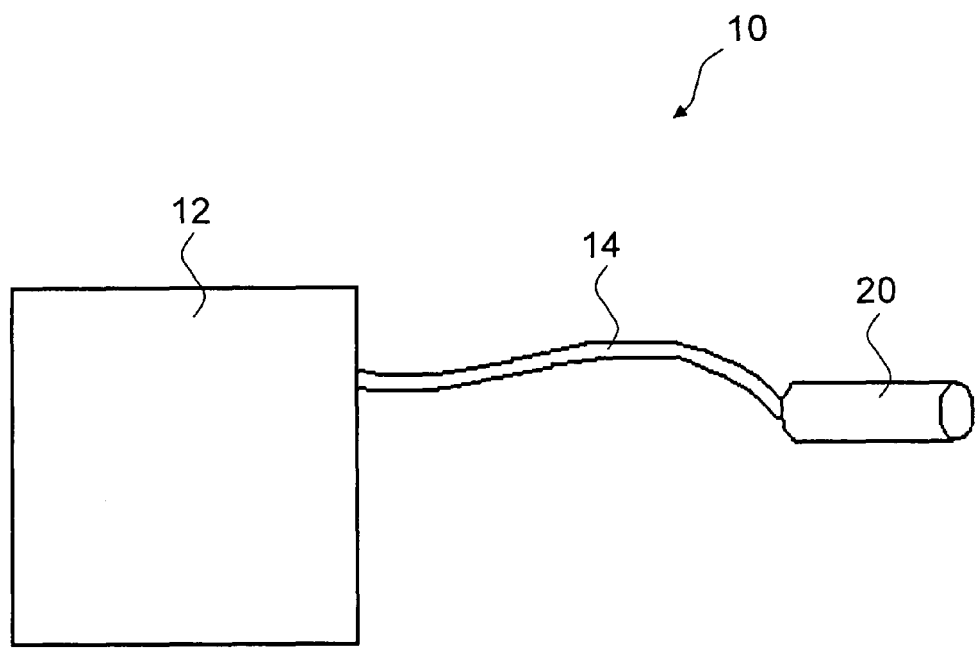
FIG. 4 shows a marking and/or scanning apparatus.

The principle structure of a marking and/or scanning apparatus 10 is shown in FIG. 4. The marking and/or scanning apparatus 10 comprises a marking and/or scanning head 20 with a plurality of marking and/or scanning devices 40. The apparatus 10 further comprises a control and driving unit 12 for controlling the marking and/or scanning devices 40. The control and driving unit 12 is connected and the marking and/or scanning head 20 through an umbilical 14. The umbilical 14 may have a plurality of fibres arranged therein.

The marking and/or scanning devices can for example be printing devices for printing an object. The printing devices can include ink jet nozzles, laser printing devices or laser engraving devices, which apply a printing with a laser beam directed onto the object. The marking and/or scanning apparatus 10 may in particular be a matrix or pixel printer or a matrix or pixel scanner.

Figure 5:
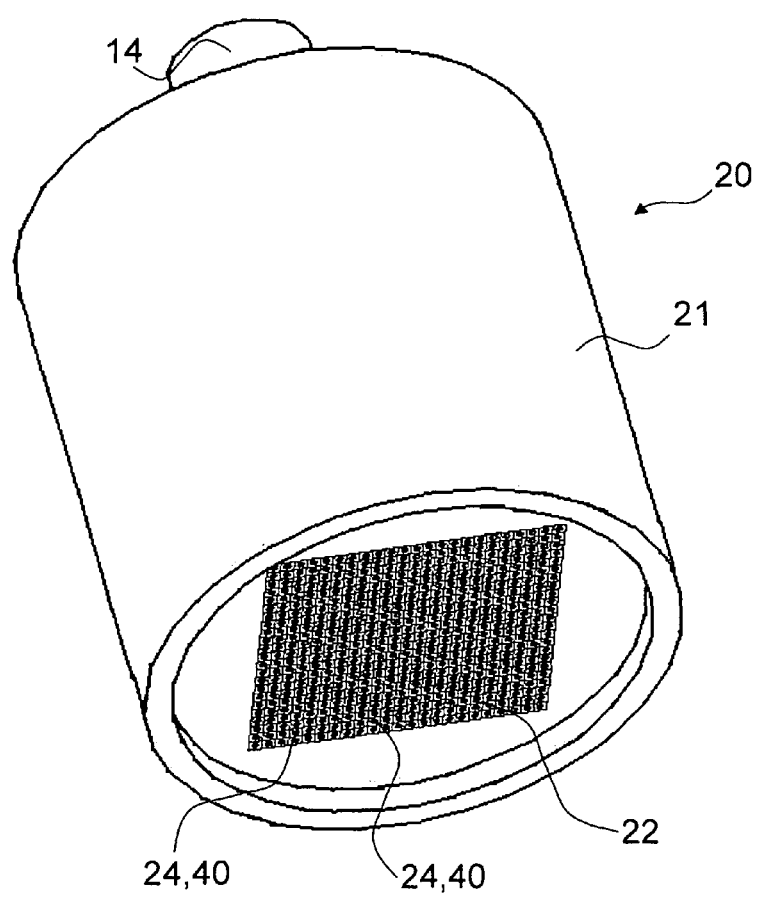
FIG. 5 shows a perspective view of a marking and/or scanning head.

FIG. 5 shows a general embodiment of a marking and/or scanning head 20, which can in particular be a printing head and/or sensor head. The marking and/or scanning head 20 comprises a housing 21, which in the shown embodiment has a cylindrical outer shape.

The marking and/or scanning head 20 includes a plurality of receiving spaces 24 arranged in a regular rectangular pattern forming a two-dimensional array 22. The receiving spaces 24 may be equipped with individual marking and/or scanning devices 40.

Figure 6:
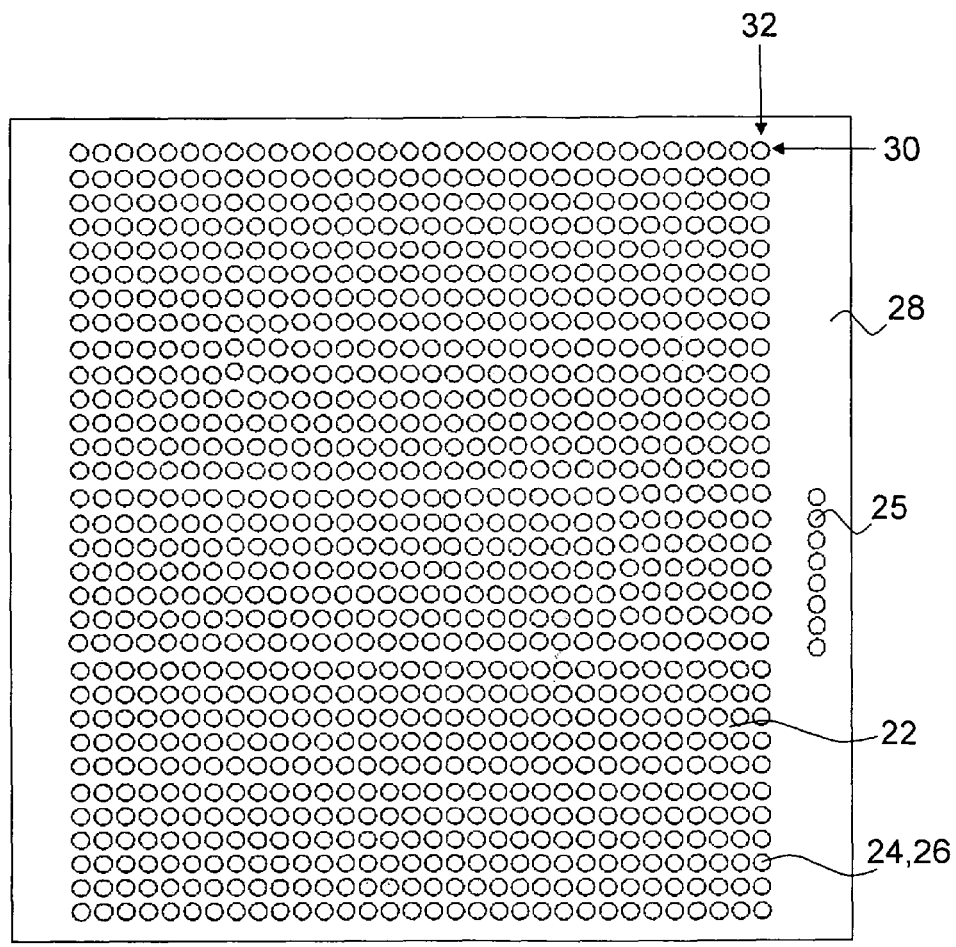
FIG. 6 shows an array of receiving spaces of a marking and/or scanning head.

An empty array 22 of receiving spaces 24 is shown in FIG. 6. The receiving spaces 24 are arranged in rows 30 and columns 32 extending perpendicularly to each other. The array 22 of receiving spaces 24 has a rectangular outer shape.

The marking and/or scanning head 20 includes a receiving plate 28 having a plurality of receiving holes 26 forming the receiving spaces 24. The receiving plate 28 may for example be a metal plate, in particular a steel plate. The receiving holes 26 each have a substantially circular cross-section and may in particular be through holes.

In the shown embodiment, the receiving plate 28 comprises an array 22 of receiving spaces 24 arranged in a regular square pattern. The shown array 22 comprises 32 times 32 receiving spaces 24. In addition to the array 22 of receiving spaces 24, a plurality of spare receiving spaces 25 is provided for accommodating spare marking and/or scanning devices. The spare receiving spaces 25 are also formed as receiving holes in the receiving plate 28.

Figure 1:
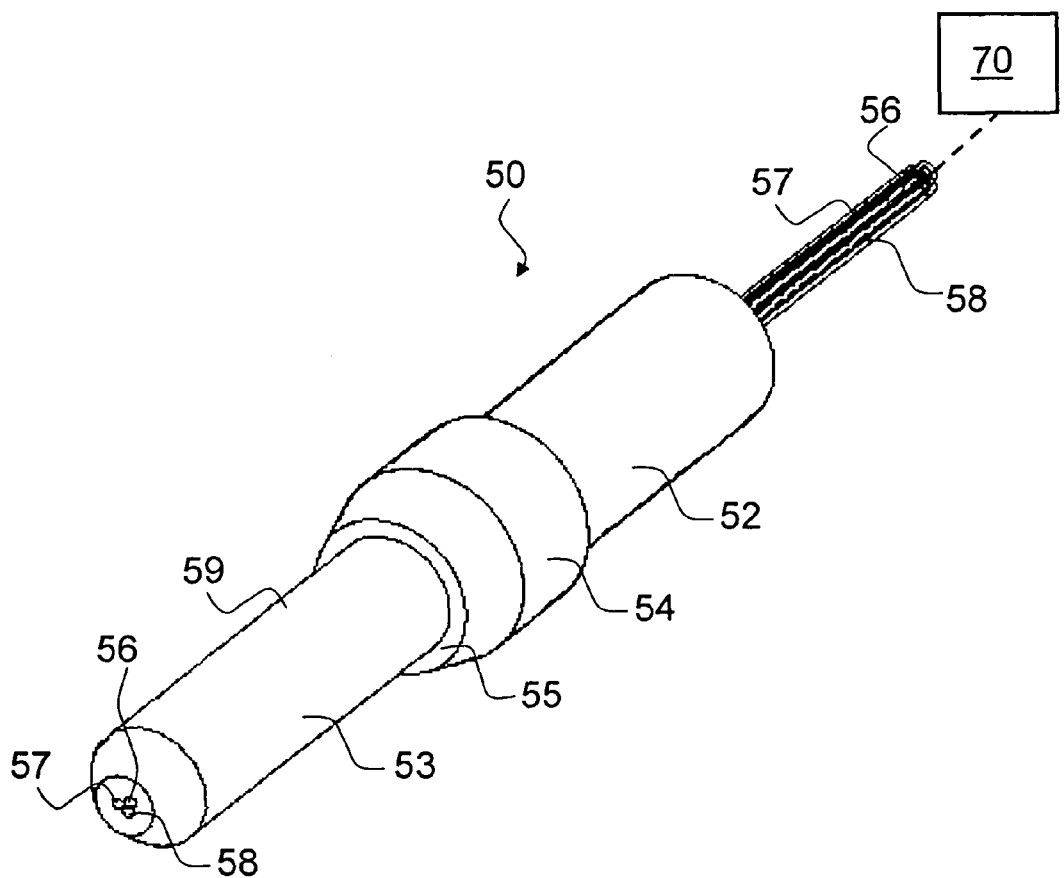
FIG. 1 shows a perspective view of an inventive measuring device.

FIG. 1 schematically shows an embodiment of a measuring device 50 according to the invention. The measuring device 50 includes a ferrule 52 with a substantially cylindrical body 53. The ferrule 52 can for example include a metal, a ceramic, a plastic material or glass. It may be preferred that the ferrule 52 includes steal or zirconia.

The body 53 of the ferrule 52 includes a connecting portion or a connector section 59 for engaging a receiving space 24 of the marking and/or scanning head 20. The connector section 59 has a substantially cylindrical shape for a mating engagement with a cylindrical receiving hole 26 provided in the receiving plate 28 of a marking and/or scanning head 20.

The body 53 of the ferrule 52 further includes a collar 54 with an abutment surface 55 for contacting a planar surface of the receiving plate 28.

The measuring device 50 comprises three optical fibres. One of the fibres is a transmitting fibre 56 for transmitting light to an object. The light can be any kind of electromagnetic radiation such as for example visible light or infrared light. The other two fibres are receiving fibres 57, 58 for receiving light transmitted by the transmitting fibre 56 and reflected by the object.

The transmitting fibre 56 and the receiving fibres 57, 58 are arranged along a longitudinal axis of the ferrule 52. In a cross-section of the ferrule, the transmitting fibre 57 and the receiving fibres 57, 58 are arranged symmetrically to each other in the corners of a triangle.

The transmitting fibre 56 is connected to a lighting element such as a light emitting diode for transmitting light through the transmitting fibre 56 onto a surface of the object. The first and second receiving fibres 57, 58 are connected to a sensor and signal processor means 70 for detecting the light signals received by the receiving fibres 57, 58 and converting a time shift between the light signals into a speed value of the object in a movement or advance direction 16. The sensor and signal processor means 70 may in particular comprise one or more sensor elements such as photodiodes for detecting the light signals.

Figure 2:
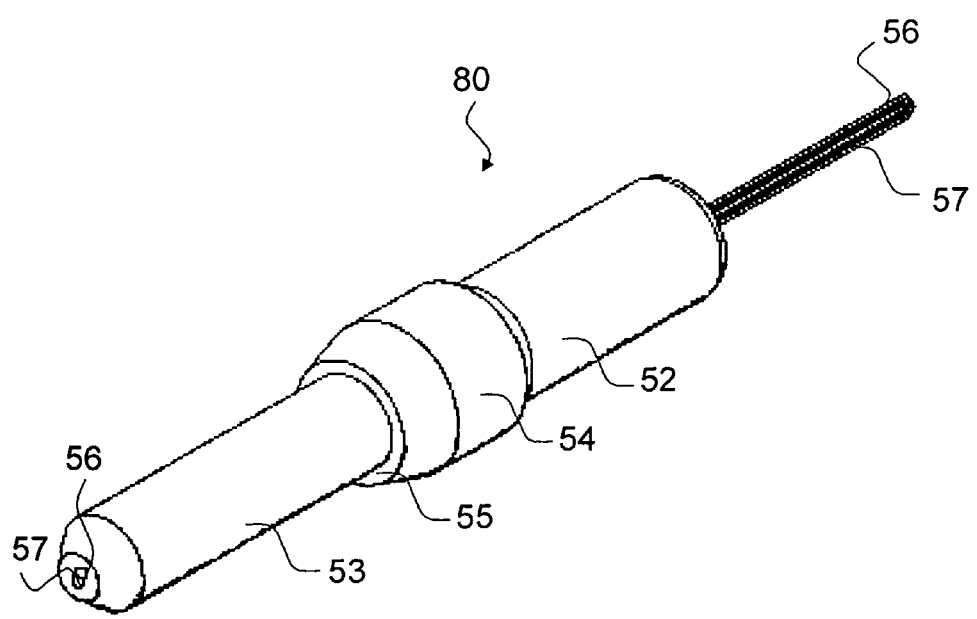
FIG. 2 shows a perspective view of an object detector.

FIG. 2 illustrates a detector device 80. The detector device 80 has fundamentally the same structure as the measuring device 50, except that it has only two fibres instead of the at least three fibres of the measuring device 50. In particular, one of the two fibres is a transmitting fibre 56 and the other is a receiving fibre 57. The detector device 80 may be used for detecting the presence of the object to be marked and/or scanned. To this end, light may be emitted from the transmitting fibre 56. If the object is present, the light will be at least partly reflected by the object and received by the receiving fibre 57. The light received by the receiving fibre 57 may then be detected by a sensor element such as a photodiode coupled to the receiving fibre 57. The detector device 80 may be used for verification of the functioning of the measuring device 50.

Figure 3:
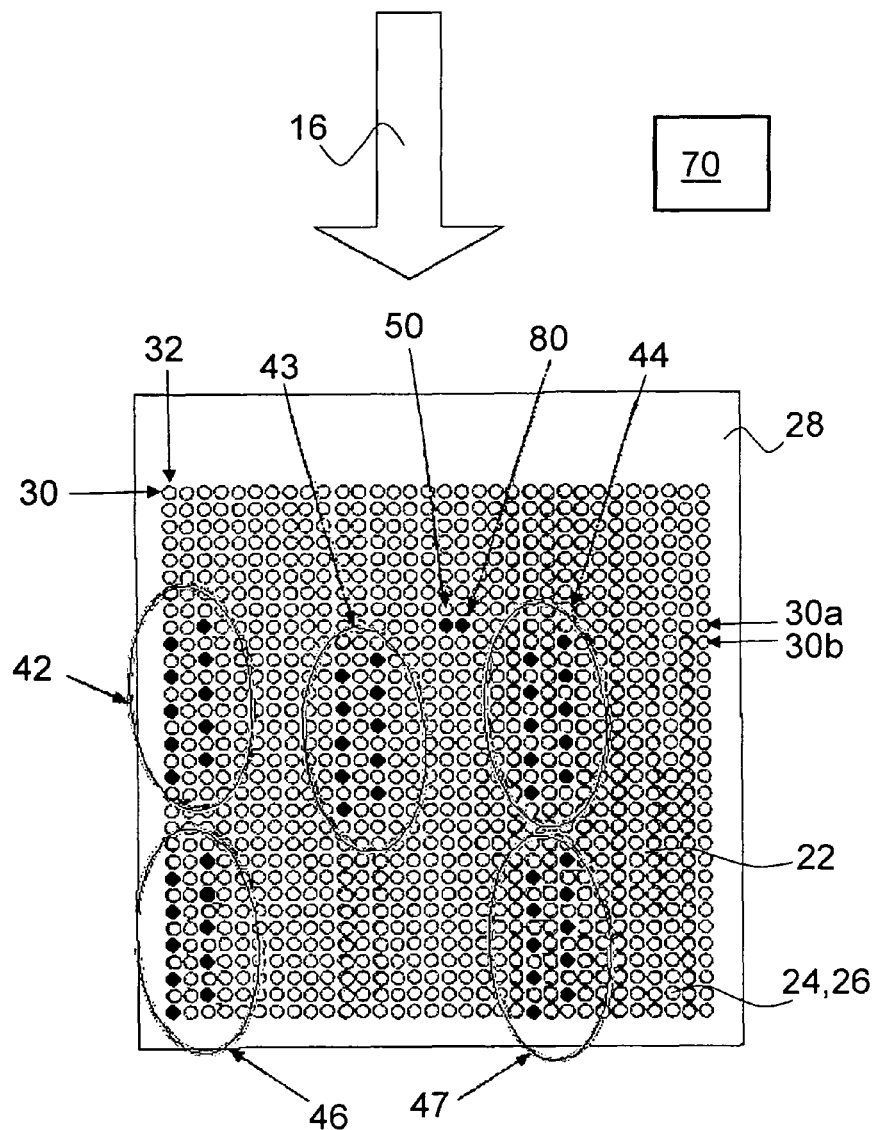
FIG. 3 shows a receiving plate of a marking and/or scanning head, which is equipped with a plurality of marking devices, a plurality of scanning devices and a measuring device.

FIG. 3 shows a receiving plate 28 of a marking and/or scanning head 20, in which the receiving spaces 24 are partly populated with marking and/or scanning devices 40. In particular, the marking and/or scanning devices 40 include a plurality of marking devices 42, 43, 44 and a plurality of scanning devices 46, 47. The marking devices 42, 43, 44 may be of different types. For example, the marking devices 42 may be ink jet nozzles, the marking devices 43 may be $CO_2$ laser ferrules and the marking devices 44 may be laser diode ferrules.

The scanning devices 44, for example sensor ferrules, are arranged downstream of the marking devices 42 in the advance direction 16 of the object. The advance direction 16 may also be called a product or object movement direction. With the scanning devices 44 a marking applied by the marking devices 42 can be verified.

In addition to the marking devices 42 and the scanning devices 44 a measuring device 50 is arranged in one of the receiving spaces 24. With the measuring device 50 the speed of the object to be marked and/or scanned can be precisely measured.

Moreover, the marking head 20 includes a detector device 80, as shown in FIG. 4, for detecting the presence of the object to be marked and/or scanned.

The array 22 of receiving spaces may be tilted or rotated with regard to the advance direction 16, so that the receiving spaces 24 of a preceding row 30a are offset with regard to the receiving spaces 24 of a successive row 30b in a transverse direction to the advance direction 16. The tilted or rotated array 22 can provide an enhanced resolution of the marking and/or scanning being performed by the marking and/or scanning head 20.

The invention claimed is:

1. An apparatus for at least one of marking and scanning an object, comprising:
   a head for at least one of marking and scanning, having a plurality of receiving spaces for individual devices for at least one of marking and scanning, and
   a driving mechanism for providing a relative movement of the object relative to the head for at least one of marking and scanning, in an advance direction during a marking or scanning operation,
   wherein
   a measuring device for measuring the speed of the object is provided, the measuring device comprising:
      a transmitter having a transmitting fibre for transmitting a light to the object,
      a receiver having a first receiving fibre and a second receiving fibre for receiving light reflected from the object, wherein the reflected light received by the first receiving fibre forms a first light signal and the reflected light received by the second receiving fibre forms a second light signal, and
      a sensor and signal processor means for detecting the first and second light signals, for determining a time shift between the first light signal and the second light signal and for converting the determined time shift to a speed value of the object,
   the transmitting fibre, the first receiving fibre and the second receiving fibre are arranged in a common first ferrule,
   the devices for at least one of marking and scanning include second ferrules,
   the first and second ferrules have corresponding connector sections and are variably connected to the receiving spaces of the head for at least one of marking and scanning, and
   the measuring device is arranged in at least one of the receiving spaces of the head for at least one of marking and scanning for measuring the speed of the object in the advance direction.

2. The apparatus of claim 1, wherein
   the receiving spaces of the head for at least one of marking and scanning are receiving holes formed in a receiving plate.

3. The apparatus of claim 1, wherein
   the receiving spaces are arranged in a two-dimensional array having a plurality of rows extending transversely to the advance direction,
   wherein the devices for at least one of marking and scanning are arranged in at least one first row and the measuring device is arranged in a second row.

4. The apparatus of claim 1, wherein
   the first receiving fibre and the second receiving fibre are arranged along the advance direction.

5. The apparatus of claim 1, wherein
   the transmitting fibre is arranged between the first receiving fibre and the second receiving fibre.

6. The apparatus of claim 1, wherein
   the sensor and signal processor means comprises at least one sensor element connected to the first receiving fibre and the second receiving fibre, the sensor element being configured to detect varying light power levels due to at least one of a roughness and a structure of a surface of the object and
   the sensor and signal processor means is configured to convert a phase shift of the varying light power levels to the speed value of the object.

7. The apparatus of claim 1, wherein
the ferrule has a body having a substantially cylindrical outer shape with a profiling for being inserted into a receiving hole of the apparatus in a defined angular position.

8. The apparatus of claim 1, wherein
the ferrule has a keyed body for being inserted into a receiving hole of the apparatus in a defined angular position.

9. The apparatus of claim 1, wherein
the ferrule has a body with a polygonal cross-section for being inserted into a receiving hole of the apparatus in a defined angular position.

10. The apparatus of claim 1, wherein
the ferrule has a molded body.

11. The apparatus of claim 1, wherein
the transmitting fibre and the first and second receiving fibres are arranged in the corners of a triangle.

12. The apparatus of claim 1, wherein
the head for at least one of marking and scanning is rotatable about an axis perpendicular to the advance direction,
a measuring means is provided for determining a tilting angle of the head for at least one of marking and scanning and
an output value of the measuring means is provided at the sensor and signal processor means.

13. A method for measuring the speed of an object with the apparatus of claim 1, wherein
light is transmitted to the object through a transmitting fibre,
the light is at least partly reflected or scattered by the object and received by a first receiving fibre and a second receiving fibre, wherein the reflected light received by the first receiving fibre forms a first light signal and the reflected light received by the second receiving fibre forms a second light signal and wherein the transmitting fibre, the first receiving fibre and the second receiving fibre are arranged in a common ferrule,
the first and second light signals are detected and
a time shift between the first light signal and the second light signal is determined and converted to a speed value of the object.

14. A method for at least one of marking and scanning an object, wherein
the object is at least one of marked and scanned by a plurality of individual devices for at least one of marking and scanning, wherein the individual devices are arranged in a common head for at least one of marking and scanning, and
the object is moved relative to the head for at least one of marking and scanning in an advance direction during a marking or scanning operation,
wherein a speed of the object in the advance direction is measured with the method of claim 13.

* * * * *